United States Patent [19]

Marks

[11] Patent Number: 5,795,473

[45] Date of Patent: Aug. 18, 1998

[54] ELONGATED FLUID FILTERING ASSEMBLY TO PREVENT CONTAMINATION FROM UNWANTED FOREIGN MATTER AND ZEBRA MUSSELS

[76] Inventor: Donald C. Marks, 815 W. Swamp Rd., Middlesex, N.Y. 14507

[21] Appl. No.: 862,718

[22] Filed: May 23, 1997

Related U.S. Application Data

[63] Continuation-in-part of Ser. No. 532,171, Sep. 22, 1995, abandoned.

[51] Int. Cl.[6] ............................................. B01D 35/00
[52] U.S. Cl. ........................ 210/232; 210/445; 210/454; 210/460; 210/463
[58] Field of Search ........................... 210/435, 445, 210/454, 459, 460, 463, 473, 232

[56] References Cited

U.S. PATENT DOCUMENTS

| | | | |
|---|---|---|---|
| 3,467,013 | 9/1969 | Conner . | |
| 4,981,586 | 1/1991 | Bartholomew | 210/435 |
| 5,223,136 | 6/1993 | Gilbert . | |
| 5,253,954 | 10/1993 | Landsberger . | |
| 5,257,643 | 11/1993 | Merrett . | |
| 5,290,445 | 3/1994 | Buttery | 210/445 |
| 5,392,806 | 2/1995 | Gallant . | |
| 5,556,543 | 9/1996 | Trabold | 210/435 |

Primary Examiner—Peter A. Hruskoci
Assistant Examiner—Betsey J. Morrison
Attorney, Agent, or Firm—Cumpston & Shaw

[57] ABSTRACT

An elongated fluid filtering assembly includes an elongated filter element housed within an elongated hollow tube. The filter and hollow tube are supported on an elevated frame by at least two resilient bushings. The resilient bushings allow easy maintenance of the filter. The hollow tube contains at least one transverse slit which allows fluid to enter the fluid chamber and contact the filter. The filter assembly is easily accessible and relatively inexpensive to maintain.

28 Claims, 5 Drawing Sheets

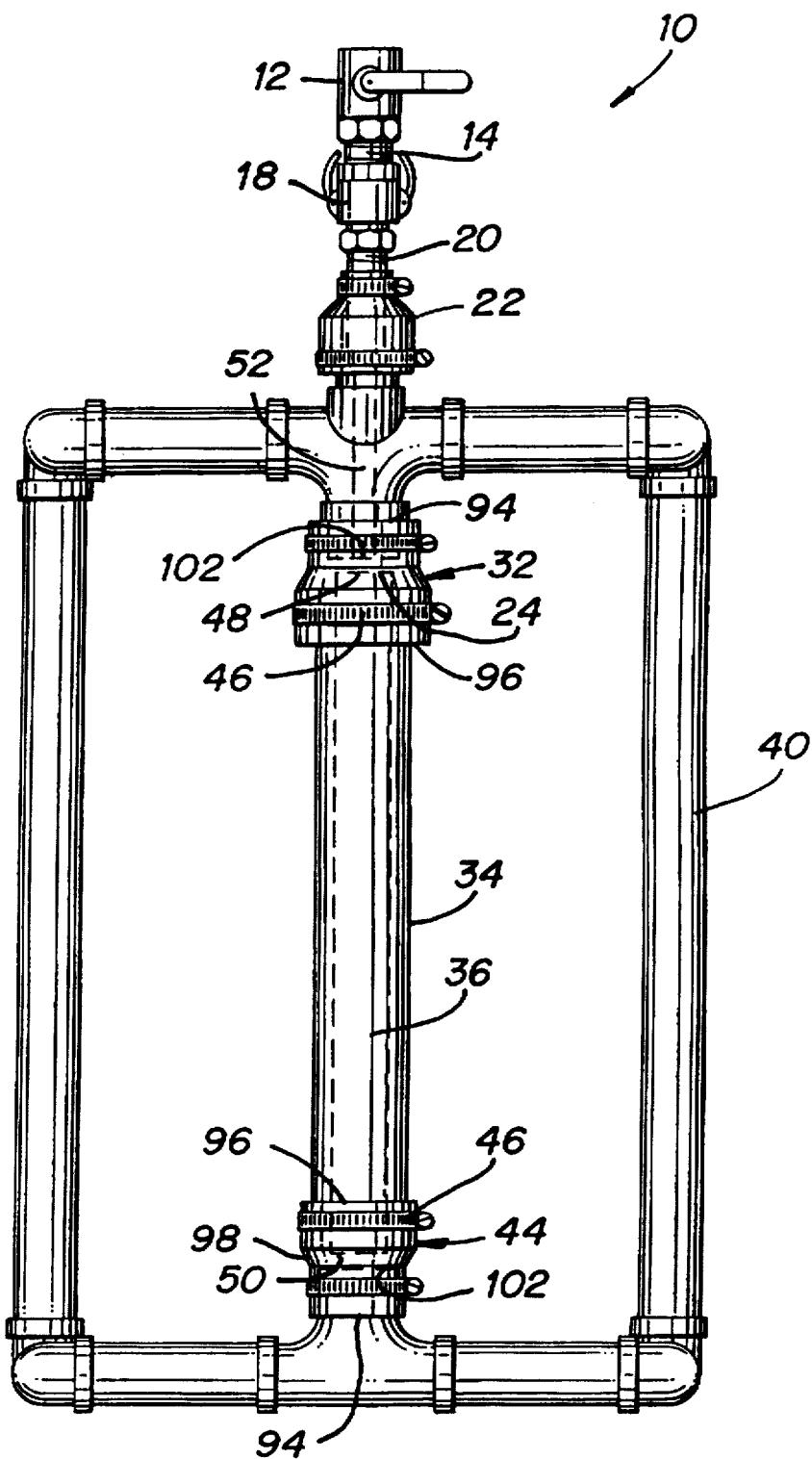
FIG_1

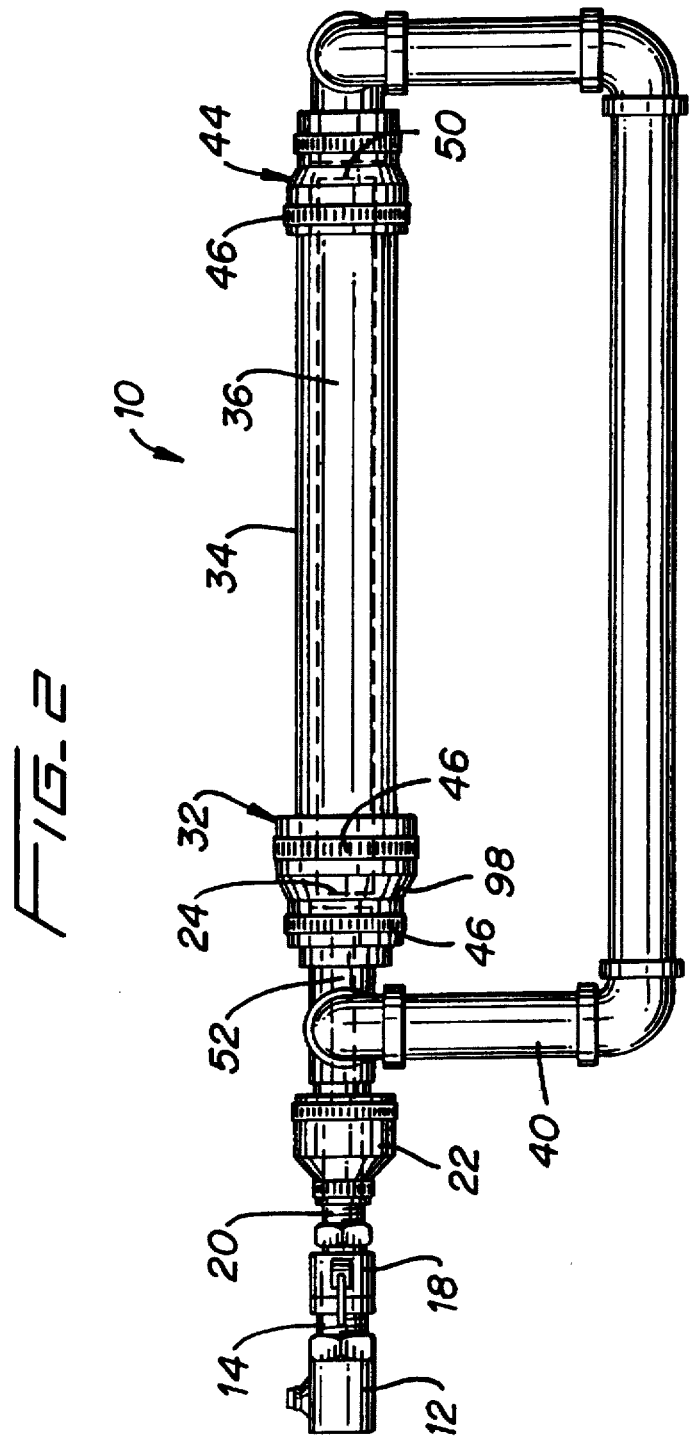

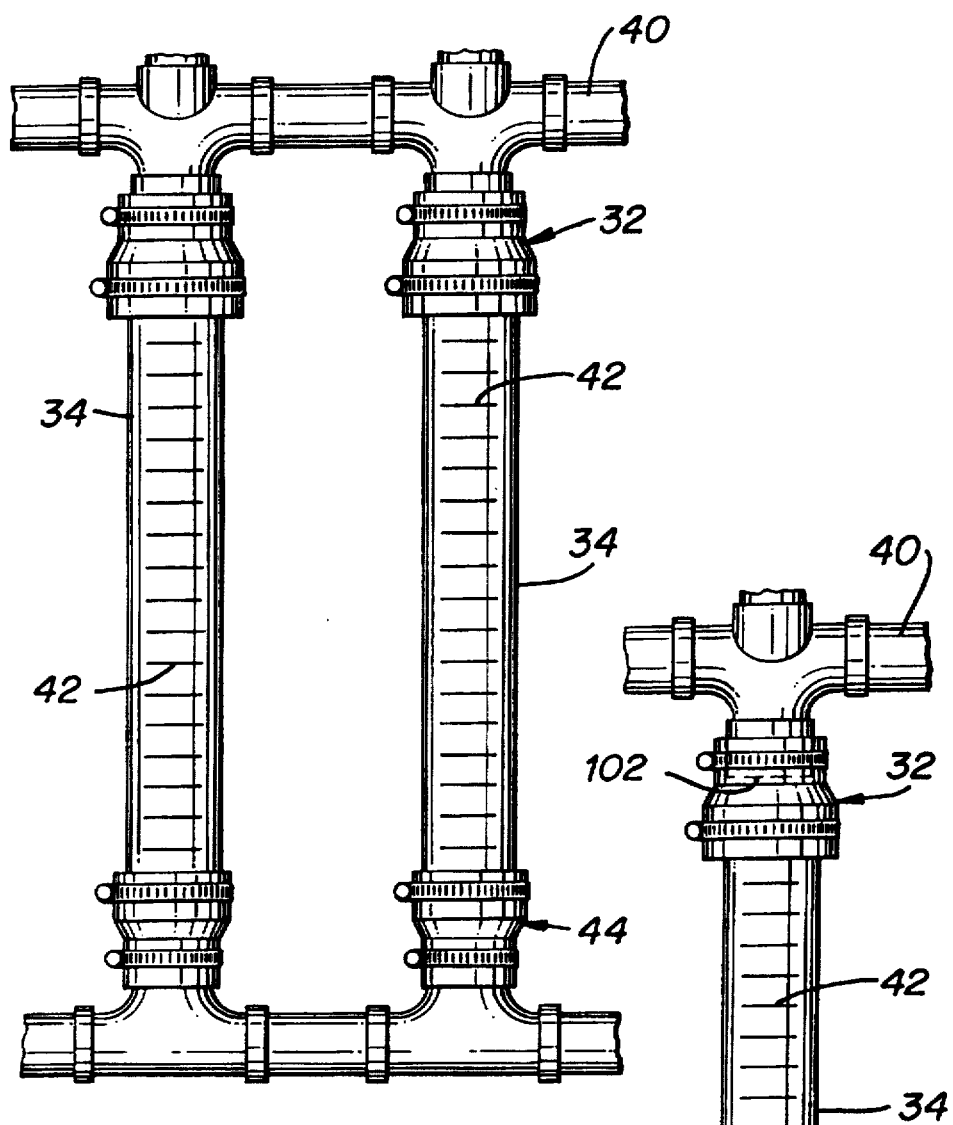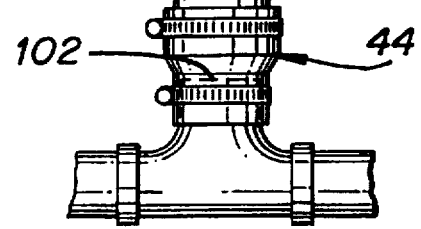

ELONGATED FLUID FILTERING ASSEMBLY TO PREVENT CONTAMINATION FROM UNWANTED FOREIGN MATTER AND ZEBRA MUSSELS

The present application is a Continuation-in-Part application, U.S. Ser. No. 08/532,171, filed on Sep. 22, 1995, abandoned naming Marks as the inventor.

FIELD OF INVENTION

The present invention generally relates to filter devices and, more particularly, to an elongated fluid filtering assembly to prevent contamination from unwanted foreign matter and zebra mussels.

BACKGROUND OF THE INVENTION

Many individuals and industries require early filtering of fluids to remove unwanted foreign matter and debris so that subsequent handling and processing of the fluids by valves, pumps and the like can effectively occur. Traditionally, debris and foreign matter, such as petroleum products or other similar contaminants, have been the primary culprits in disrupting fluid processing. The filters become clogged and must be cleaned on a regular basis.

In recent years, infestation of fresh water pipe inlets by zebra mussels has presented a serious problem to industry and home owners alike. The zebra mussels attach themselves to the inner surfaces of water intake pipes and quickly reproduce to such an extent that water flow through the pipes is impeded, thereby adversely effecting the operation of the water intake device.

Various techniques have been proposed to cope with the infestation of zebra mussels to either prevent the attachment of the zebra mussels or provide a mechanical removal process. The prevention techniques include the use of complex fluid filtering assemblies, chemicals such as chlorine, or the use of heat treatment in which hot water is caused to flow through the pipes periodically.

Many fluid filtering devices which have been used heretofore for filtering unwanted foreign matter are unsatisfactory due to clogging of the filter, lack of reliability of the filter, and the complicated construction of the filter assembly, which prohibits easy disassembly for maintenance and cleaning of the filter, increasing both the initial cost and the day to day operating costs. The installation of elaborate and complex fluid filtering assemblies, such as redundant intake pipes or heavy, self-contained filtering houses, is prohibitively expensive and requires divers or other specialists to service the equipment. An individual cannot service the filter assembly without incurring great expense and loss of time.

The use of chemicals, although effective, is not permitted in most instances because of Environmental Protection Agency regulations, while the use of hot water treatment requires the installation of additional equipment which may be too costly, particularly for the individual.

In view of the aforementioned problems frequently encountered with existing fluid filtering devices and techniques for eliminating zebra mussel contamination, a need still exists for a more efficient, versatile, and reliable fluid filtering device to prevent contamination from unwanted foreign matter, such as zebra mussels.

SUMMARY OF THE INVENTION

In view of the foregoing, it is therefore the object of the present invention to provide a fluid filtering device which removes unwanted foreign matter, debris, zebra mussels, and is easily serviceable and relatively inexpensive to maintain.

Accordingly, the present invention is directed to an elongated fluid filtering assembly comprising a fixed frame having at least two resilient bushings facing each other; an elongated hollow tube having at least one transverse slit, a first end and a second end, with the tube positioned between the two bushings; and a filter, housed within the tube, supported and centered in the tube by the bushings, the filter having an open first end and a sealed second end.

BRIEF DESCRIPTION OF THE DRAWINGS

The foregoing and additional objects, features and advantages of the present invention will become apparent from the following detailed description of preferred embodiments thereof, taken in conjunction with the accompanying drawings in which:

FIG. 1 is a top view of the water intake filter assembly according to the invention;

FIG. 2 is a side view of the water intake filter assembly;

FIG. 3 is a bottom view of the water intake filter assembly showing the transverse slits in the outer tubes of the twin filter assembly;

FIG. 5 is a bottom view of the single filter assembly illustrating the transverse slits in the outer tube.

DETAILED DESCRIPTION OF THE PREFERRED EMBODIMENT

Figure 4:
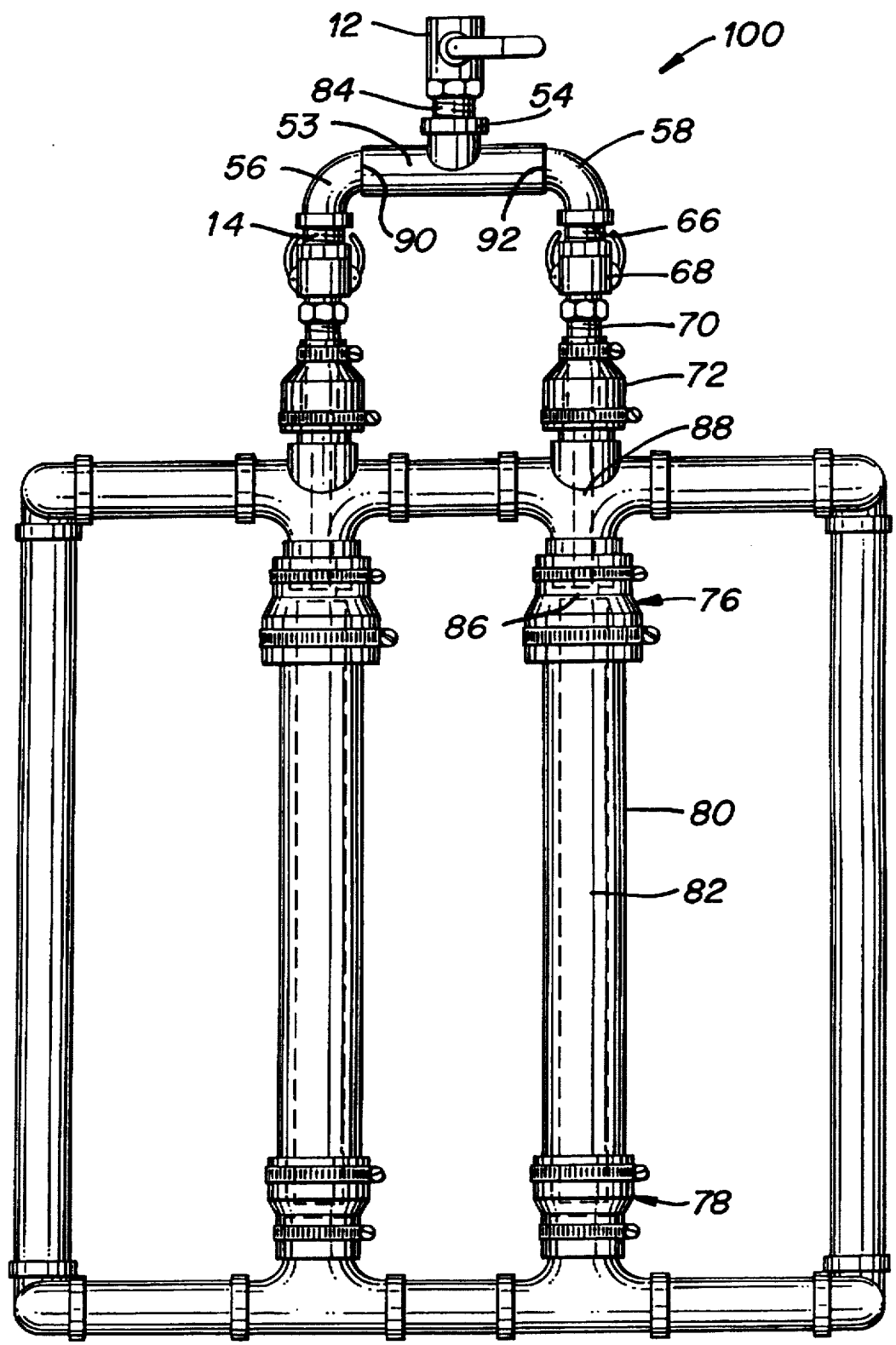
FIG. 4 is a top view of a twin filter assembly.

Referring to the drawings, and particularly to FIGS. 1 and 2, an elongated fluid filtering assembly, generally designated 10, is illustrated in accordance with the present invention. The assembly 10 generally includes a frame 40, an elongated hollow tube 34 supported in the frame by at least two resilient bushings 32 and 44 facing each other. A filter 36 is housed within the hollow tube 34 and is centered in the tube 34 by the bushings 32 and 44. The filter has an open first end 48 and a sealed second end 50. The elongated hollow tube, preferably manufactured from copper to inhibit the attachment of zebra mussels, contains at least one transverse slit 42 on its underside. The transverse slits 42 allow water to enter the filter chamber but prevents unwanted debris and large zebra mussels from entering the fluid chamber, as shown in FIG. 5.

The bushings 32 and 44 are preferably comprised of a resilient, flexible material, which can be a natural or synthetic rubber or any suitable material. Referring to FIG. 1, the bushings 32 and 44 have a small opening end 94, a large opening end 96, and a taper 98 formed there between, which centers the filter 36 in the outer tube 34. The bushings 32 and 44 are held onto the frame at sealing surfaces 102, as shown in FIG. 1 and FIG. 5, at the small end 94. The large end 96 of the bushings securely positions the hollow tube and filter. A series of circular hose clamps 46 securely tighten the bushings onto the frame and the large ends 96 onto the hollow tube and filter. The clamps 46 are easily tightened and loosened to facilitate either installation or removal of the filter 36 and hollow tube 34. The sealing surfaces of the fixed frame are spaced further apart than the length of the filter 36. The bushings 32 and 34 are preferably spaced less than the length of the filter 36. Therefore, the sealing surfaces of the fixed frame are spaced long enough to allow easy removal and installation of the filter without disturbing the frame. Only the resilient bushings must be manipulated to allow the removal of the hollow tube and the filter. The resiliency of the bushings allow an individual to pull the large opening end 96 of the bushing 44 off the hollow tube 34, and angle the hollow tube 34 and the filter 36 within the tube 34 out of alignment with the frame and bushings to such a degree to allow the easy removal of the filter 36. The filter may then be cleaned or replaced by a new filter.

To install a filter, the filter 36 is inserted, open end 48 first into the hollow tube, and the tube is then repositioned between the frame and the two bushings 32 and 44. The large opening end 96 of the bushing 44 is then pushed over the hollow tube 34 and the clamps 46 are tightened, preferably with a hex-headed nut driver, a screwdriver, snap clamps or other suitable clamping mechanisms.

The filter 36 is constructed to be pervious to fluids and impervious to solids above a predetermined size. Preferably, the filter 36 is cylindrical and made from ceramic silicone, but may be any suitable filtering device, such as closed mesh. The filter 36 may be designed to filter zebra mussels or any type of debris or heavy fluid such as petroleum or crude oil.

The filter 36, which has an open first end 48 and a sealed second end 50, is positioned such that the open first end 48 is connected to one end of an adapter 24. The other end of the adapter 24 is connected to an outlet pipe 52 which passes through the frame 40 and through another resilient bushing 22, which further supports the filter assembly. A connecting nipple 20, preferably composed of brass, connects one end of the outlet pipe 52 to the cam lock quick disconnect 18. The cam lock quick disconnect 18 is then connected in series with a first close coupling nipple 14, also preferably composed of brass, and a shut-off valve 12. The shut-off valve 12 is preferably a brass ball valve.

Still referring to FIG. 1, the frame 40 is composed of sections made from metal, copper, alloy, or plastic, preferably polyvinyl chloride (PVC). The frame preferably contains four legs, a base and an elevated section. The base has two longitudinally extending members which serve as a base for the four legs which may be interconnected with elbows, preferably metal or PVC elbows. Preferably, the frame is fixed, inseparable, or unalterable in its arrangement. The elbows may be glued together or may be soldered, bolted, melted, fused, or other appropriate means to securely bind the frame together. The frame may also be made from jointless, heat formed polyvinyl chloride. The legs support an elevated section comprising two transverse pipes which contain T-shaped adapters which support the filter element in its elevated state. Preferably, the frame sections are filled with a cement mix with reinforcing cable, or any suitable material to add weight and strength to the frame, thus enabling the frame to sit on the bottom of a lake or fluid tank. A flotation device or buoy may be attached to the frame to allow quick identification and location. The filter assembly, while containing cement in its frame, will still be lightweight enough to allow a person to move the assembly.

Turning to FIG. 4, an alternative embodiment 100 is shown whereby two elongated filtering devices are positioned side by side. The two filters comprise the same construction as the aforementioned single filtering unit, except for the connection from the cam lock quick disconnect assembly to the shut off valve.

First and second flexible bushings 76 and 78 are attached to the frame, supporting and centering a second hollow tube 80 and a filter 82 on the frame. Preferably, the second hollow tube 80 is also copper and has at least one transverse slit. Connected to the filter, in series, are a second adapter 86, outlet pipe 88, flexible bushing 72, nipple 70, cam lock quick disconnect assembly 68, and a second close coupling nipple 66. The second close coupling nipple 66 is then attached to a second elbow 58, preferably a 90° angle street elbow. In this alternative embodiment, the first close coupling nipple 14 is also connected to a first elbow 56, preferably a 90° angle street elbow.

A T-shaped adapter 52 having a first end 90 and a second end 92 connects the two filter units. The first end 90 of the T-shaped adapter is attached to the first elbow 56 and the second end 92 is attached to the second elbow 58. The T-shaped extension adapter 52 further comprises a center opening 54 which is connected to a third close coupling nipple 84. The third close coupling nipple 84 is then connected to a shut off valve 12.

As shown in FIGS. 3 and 5, the outer tube has a least one transverse slit 42 in the bottom portion of the tube. The transverse slits allow water to enter the flow chamber and filter through the filter inside the tube. The filtering assembly may also be used as an aerator or dispersion device. Reverse pressure flow allows air to be dispersed into the surrounding fluid environment. The reverse pressure flow may also be utilized to clean the filter assembly, without any manual intervention.

Figure 6:
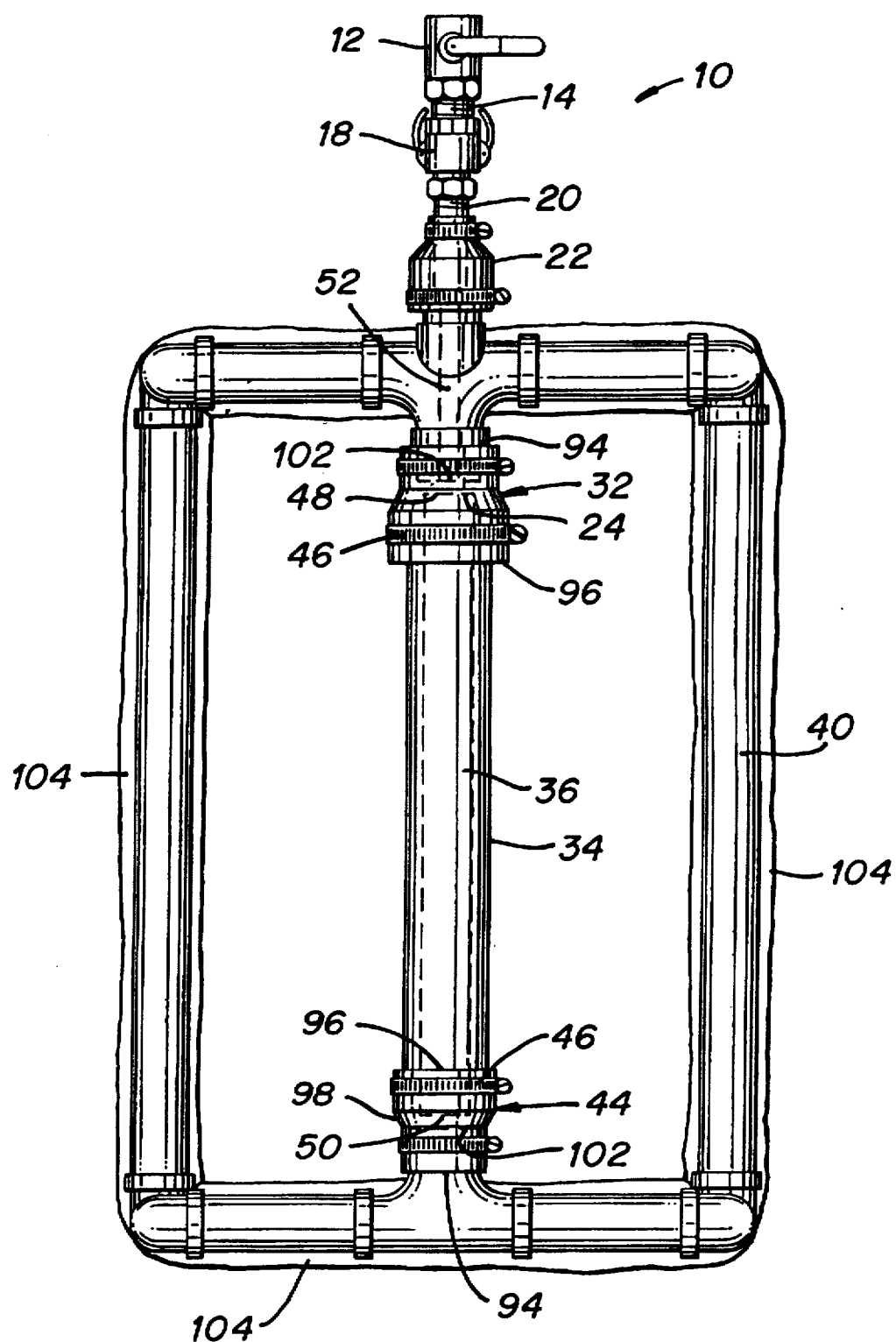
FIG. 6 is a top view of the water intake filter assembly showing the inflatable bladder.

In a further embodiment, shown in FIG. 6, an inflatable bladder 104 may be attached to the frame to assist in raising the assembly from its underwater environs. The bladder, preferably comprised of rubber, plastic, or other suitable material, may be inflated using an external source of pressured gas or other suitable source. The bladder may be deflated when the operator desires to position the assembly on the bottom of the lake, pond or tank.

The present invention and its advantages will be understood from the foregoing description, and it will be apparent that various changes may be made thereto without departing from the true spirit and scope of the invention or sacrificing all of its material advantages, the form herein before described being merely preferred or exemplary embodiment thereof.

What is claimed is:

1. A fluid intake filter, comprising:
   (a) a fixed frame having at least two resilient bushings facing each other, and having at least two sealing surfaces for sealingly engaging at least two resilient bushings respectively, the sealing surfaces set a fixed distance apart;
   (b) an elongated hollow tube having at least one transverse slit, a first end and a second end, the tube positioned between the two bushings facing each other;
   (c) a filter housed within the tube supported and centered in the tube by the bushings, the filter having an open first end and a sealed second end; and
   (d) the bushings, the frame and sealing surfaces are selected to permit removal of the bushings, the tube, and the filter without displacing the sealing surfaces.

2. The fluid intake filter as defined in claim 1 further comprising an adapter, one end of the adapter being attached to the first end of the filter wherein the sealing surface is disposed on the adapter such that the bushings, the frame and the sealing surfaces are selected to permit removal of the bushings, the tube, and the filter without displacing the sealing surfaces.

3. The fluid intake filter as defined in claim 2 further comprising an outlet pipe passing through the frame and at least one bushing, the outlet pipe connecting the other end of the adapter to a nipple.

4. The fluid intake filter as defined in claim 3 further comprising a cam lock quick disconnect assembly, the cam lock quick disconnect assembly attachedly connected to the outlet pipe via the nipple.

5. The fluid intake filter as defined in claim 4 in which the cam lock quick disconnect assembly is connected in series with a first close coupling nipple and a shut off valve.

6. The fluid intake filter as defined in claim 4 wherein the nipples are brass.

7. The fluid intake filter as defined in claim 1 in which the bushings have a small opening end, a large opening end, and a taper formed therebetween, the taper centering the filter within the tube.

8. The fluid intake filter as defined in claim 1 wherein the hollow tube is copper and has at least one transverse slit.

9. The fluid intake filter as defined in claim 1 wherein the filter is ceramic.

10. The fluid intake filter as defined in claim 1 wherein the frame is polyvinyl chloride.

11. The fluid intake filter as defined in claim 5 wherein the shut off valve is a brass ball valve.

12. The fluid intake filter as defined in claim 1 further comprising an inflatable bladder.

13. A fluid intake filter comprising:

(a) a frame having at least two resilient bushings facing each other, and having at least two sealing surfaces for sealingly engaging at least two resilient bushings respectively, the sealing surfaces set at a fixed distance apart;

(b) at least a first elongated hollow tube having at least one transverse slit, a first end and a second end, the tube positioned between the two bushings facing each other; and (c) at least a first filter housed within at least a first tube supported and centered in the tube by the bushings, the filter having an open first end and a sealed second end; and (d) the bushings, the frame and sealing surfaces are selected to permit removal of the bushings, the tube, and the filter without displacing the sealing surfaces.

14. The fluid intake filter as defined in claim 13 further comprising a first elbow, and an adapter, one end of the adapter being attached to the first end of the filter.

15. The fluid intake filter as defined in claim 14 further comprising an outlet pipe passing through the frame and at least one bushing, the outlet pipe connecting the other end of the adapter to a nipple.

16. The fluid intake filter as defined in claim 15 further comprising the nipple connecting a cam lock quick disconnect assembly to the outlet pipe.

17. The fluid intake filter as defined in claim 16 in which the cam lock quick disconnect assembly is connected in series with a close coupling nipple and a shut off valve.

18. The fluid intake filter as defined in claim 13 in which the bushings have a small opening end, a large opening end, and a taper formed there between, the taper centering the filter within the tube.

19. The fluid intake filter as defined in claim 16 wherein the nipples are brass.

20. The fluid intake filter as defined in claim 13 wherein the outer tube is copper and has at least one transverse slit.

21. The fluid intake filter as defined in claim 13 wherein the filter is ceramic.

22. The fluid intake filter as defined in claim 13 wherein the frame is polyvinyl chloride.

23. The fluid intake filter as defined in claim 17 wherein the shut off valve is a brass ball valve.

24. The fluid intake filter as defined in claim 13 further comprising a second hollow tube, a second filter and first and second resilient bushings attached to the frame, supporting and centering the second tube and second filter on the frame.

25. The fluid intake filter as defined in claim 24 further comprising a second adapter, connected to the second filter at one end and connected, in series, at the other end, to a second outlet pipe, a resilient bushing, a nipple, a cam lock quick disconnect assembly, a second close coupling nipple, and a second elbow.

26. The fluid intake filter as defined in claim 25 further comprising the first elbow connected at one end to the first close coupling nipple, and a T-shaped adapter having a first end, a second end, and a center opening, the first end connected to one end of the first elbow, the second end is connected to the second elbow, and the center opening connected to a third close coupling nipple.

27. The fluid intake filter as defined in claim 26 further comprising a shut off valve connected to the third close coupling nipple.

28. The fluid intake filter as defined in claim 24 wherein the second hollow tube is copper and has at least one transverse slit.

* * * * *